UNITED STATES PATENT OFFICE.

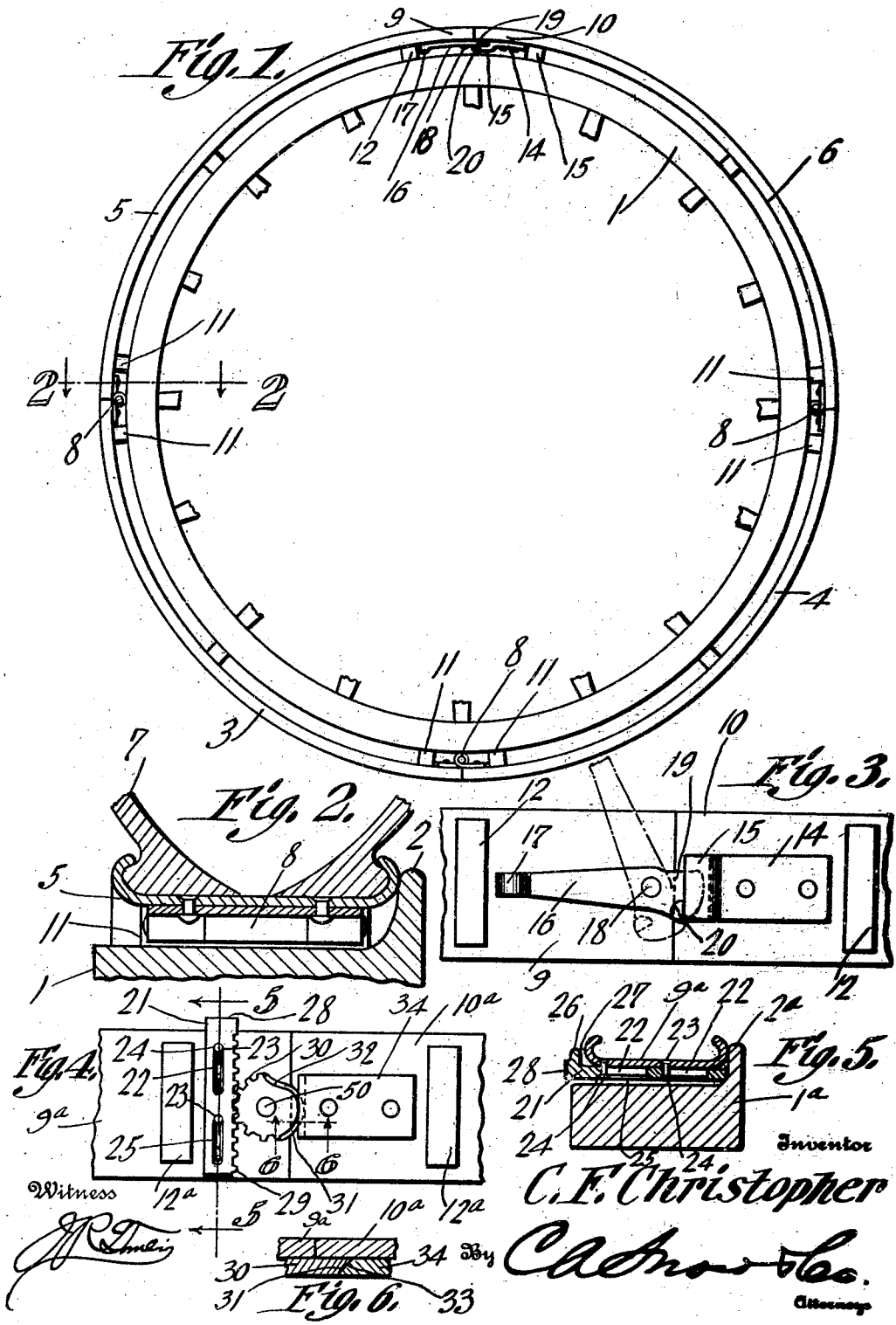

CALVIN F. CHRISTOPHER, OF ASHEVILLE, NORTH CAROLINA.

WHEEL-RIM.

1,346,178.    Specification of Letters Patent.    Patented July 13, 1920.

Application filed July 12, 1919. Serial No. 310,353.

*To all whom it may concern:*

Be it known that I, CALVIN F. CHRISTOPHER, a citizen of the United States, residing at Asheville, in the county of Buncombe and State of North Carolina, have invented a new and useful Wheel-Rim, of which the following is a specification.

The device forming the subject matter of this application is a demountable rim for a vehicle wheel, and one object of the invention is to provide a rim which may be folded readily into small compass, so as to facilitate the removal of the rim from a tire, after the tire and the rim have been slipped laterally off the wheel body.

Another object of the invention is to provide novel means for reinforcing and sustaining the demountable rim adjacent to the hinges which unite the parts of the rim.

Another object of the invention is to improve the latch mechanism which holds the relatively free ends of the rim together.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a portion of a wheel body whereunto the device forming the subject matter of this application has been applied; Fig. 2 is a cross section on the line 2—2 of Fig. 1; Fig. 3 is a plan showing a portion of the inner surface of the demountable rim, adjacent to the free ends of the rim; Fig. 4 is a view similar to Fig. 3, but disclosing a modified latch mechanism; Fig. 5 is a cross section on the line 5—5 of Fig. 4; and Fig. 6 is a section taken approximately on the line 6—6 of Fig. 4.

Referring to the invention as disclosed in Figs. 1, 2 and 3, the numeral 1 denotes a wheel body provided at one side with the usual stop flange 2. In carrying out the invention, there is provided a demountable rim including parts 3, 4, 5 and 6 adapted to coöperate with a tire 7 of any desired sort. The parts 3—4, 4—6 and 3—5 of the demountable rim are united by hinges 8. The free end of the part 5 of the demountable rim is denoted by the numeral 9, the numeral 10 marking the corresponding free end of the part 6 of the rim. The parts of the rim carry lugs 11 located closely adjacent to the hinges 8. There are lugs 12 on the relatively movable ends 9 and 10 of the respective parts 5 and 6 of the rim. The end 10 of the rim is provided with a keeper 14 having an offset extremity 15. A lever latch 16 is provided, the same being equipped at one end with a projection 17 whereby the latch may be manipulated readily, the latch being mounted intermediate its ends on a pivot element 18 carried by the end 9 of the rim. The lever latch 16 includes an enlarged head 19 adapted to engage beneath the offset end 15 of the keeper 14, the head 19 being supplied with a stop projection 20 which, coöperating with the edge of the part 15 of the keeper 14, limits the swinging movement of the lever latch, when the same is moved into locked position, from the dotted line showing of Fig. 3 to the solid line showing of that figure.

It will be obvious that when the latch 16 is disengaged from the end 15 of the keeper 14, the parts 3, 4, 5 and 6 of the demountable rim may be folded inwardly on the hinges 8, it being possible, thus, to separate the demountable rim from the tire 7, and it being unnecessary to pry the tire loose from the rim, by means of a screw driver or a like tool, in accordance with the known and established practice. The rim, therefore, may be detached readily from the tire without inflicting injury either to the tire or to the inner tube. The lugs 11, coöperating with the wheel body 1, support the ends of the parts 3, 4, 5 and 6 adjacent to the hinges 8, and take practically all of the strain off the hinges, so far as flexure toward the axis of rotation of the wheel is concerned. The lugs 12 exercise a like office with respect to the relatively movable ends 9 and 10 of the rim. Since the lever latch 16 is supplied with the stop projection 20, it is unnecessary to provide the lever latch and the end 9 of the rim with interengaging elements, for the purpose of holding the lever latch in the position shown in solid line in Fig. 3. The lever latch merely is swung on the pivot 18 until the stop projection 20 engages the end of the part 15 of the keeper 14.

In the form shown in Figs. 4, 5 and 6, parts hereinbefore described have been designated by numerals previously used, with the suffix "a". The numeral 21 denotes an actuating strip mounted on the end $9^a$ to slide transversely thereof, the strip having longitudinal slots 22 receiving retainers or guides 23 engaged with the end $9^a$, the retainers having heads 24, and the slots 22 being countersunk, as shown at 25, to receive the heads. The strip 21, obviously, is mounted on the end $9^a$ for right line sliding movement. The actuating strip 21 is supplied on one end with a projection 26 extending radially of the wheel body and coöperating with one side flange of the demountable rim. When the strip 21 is thrust inwardly, one end of the strip abuts against the stop flange $2^a$ of the wheel body $1^a$ and the projection 26 is spaced, as shown at 27, from the adjacent edge of the rim. The actuating strip 21 is provided, near to the projection 26, with a boss 28 extended laterally with respect to the median plane of the wheel. A rack 29 is formed on one edge of the strip 21 and meshes into an interrupted pinion 30 having a beveled edge 31, a portion of the said beveled edge being straight, or nearly so, as shown at 32. The pinion 30 is journaled at 50 on the end $9^a$ of the demountable rim. The beveled edge 31 of the pinion 30 coöperates with the beveled edge 33 of a keeper 34 secured to the end $9^a$ of the demountable rim.

The actuating strip 21 may be driven inwardly by hammer blows applied to the boss 28 and in this connection it is to be observed that the boss projects outwardly from the part 26, so that the part 26 cannot be broken off by the hammer blows. When the strip 21 is driven inwardly, the strip slides on the retainers 23, the rack 29 on the strip coöperating with the pinion 30, the pinion rotating on its shaft 50, and the beveled edge 31 of the pinion coöperating with the beveled edge 33 of the keeper 34 to hold the ends $10^a$ and $9^a$ in circumferential alinement. A screw driver or like tool may be inserted into the space 27 between the projection 26 and the adjacent portion of the rim-end $9^a$. The strip 21 may then be pried outwardly, the rack 29 coöperating with the pinion 30 and rotating the pinion until the approximately straight part 32 of the edge of the pinion is parallel to the end of the keeper 34. The pinion thus is disengaged from the keeper and the ends 9 and $9^a$ of the rim may be swung inwardly toward the center of the wheel body 1.

Having thus described the invention, what is claimed is:—

A demountable rim having relatively movable ends; a keeper on one of said ends; an interrupted pinion journaled on the other of said ends and coöperating with the keeper; and an actuating member mounted to slide on the last specified end of the rim, the actuating member having a rack meshing into the pinion.

In testimony that I claim the foregoing as my own, I have hereto affixed my signature in the presence of two witnesses.

CALVIN F. CHRISTOPHER.

Witnesses:
S. D. HALL,
R. A. CARRIER.